(12) United States Patent
Hovstein

(10) Patent No.: US 9,151,858 B2
(45) Date of Patent: Oct. 6, 2015

(54) METHOD AND SYSTEM FOR SENSOR GEOMETRY

(75) Inventor: Vegard Evjen Hovstein, Trondheim (NO)

(73) Assignee: MARITIME ROBOTICS AS, Trondheim (NO)

( * ) Notice: Subject to any disclaimer, the term of this patent is extended or adjusted under 35 U.S.C. 154(b) by 40 days.

(21) Appl. No.: 12/680,313

(22) PCT Filed: Sep. 29, 2008

(86) PCT No.: PCT/NO2008/000346
§ 371 (c)(1),
(2), (4) Date: May 5, 2010

(87) PCT Pub. No.: WO2009/045109
PCT Pub. Date: Apr. 9, 2009

(65) Prior Publication Data
US 2010/0235098 A1    Sep. 16, 2010

(30) Foreign Application Priority Data
Oct. 3, 2007 (NO) .................................. 20074975

(51) Int. Cl.
*G01V 1/38* (2006.01)
*G05D 1/02* (2006.01)
(Continued)

(52) U.S. Cl.
CPC ............... *G01V 1/3808* (2013.01); *G01S 15/89* (2013.01); *G01V 1/3826* (2013.01); *G05D 1/0206* (2013.01); *G05D 1/0293* (2013.01); *G05D 1/104* (2013.01); *G01C 13/008* (2013.01)

(58) Field of Classification Search
CPC ..... G01C 13/008; G01S 15/89; G01S 15/8902; G01S 13/003; G01S 13/90; G01V 1/3808
USPC .............................................. 701/116, 300, 21
See application file for complete search history.

(56) References Cited

U.S. PATENT DOCUMENTS 3,890,593 A * 6/1975 Davis ............................. 367/20
3,906,352 A * 9/1975 Parker ............................ 367/19
(Continued)

FOREIGN PATENT DOCUMENTS

EP        154968 A2 *  9/1985 ............... G01V 1/38
EP        188928 A1 *  7/1986 ............... G01V 1/38
(Continued)

OTHER PUBLICATIONS

Gaer, Marvin C. et al., "Progress in developing a GPS guided bistatic ocean bathymetric system", Oceans '90 Conference Proceedings: Engineering in the Ocean Environment. Date of Conference: Sep. 24-26, 1990, pp. 372-375.*
(Continued)

*Primary Examiner* — Behrang Badii
*Assistant Examiner* — David Testardi
(74) *Attorney, Agent, or Firm* — Ladas & Parry LLP

(57) ABSTRACT

Method and system for dynamical sensor geometry by means of formation control of sensor carrying craft, which operate below the water surface, on the ground, at the water surface and/or in the air, are manned and/or unmanned, and which are provided with one or more sensors. The sensors are arranged on the sensor carrying craft, and/or arranged with the sensor carrying craft in other suitable ways, such as towed behind the craft.

5 Claims, 3 Drawing Sheets

(51) Int. Cl.
  *G01S 15/89* (2006.01)
  *G05D 1/10* (2006.01)
  *G01C 13/00* (2006.01)

(56) References Cited

U.S. PATENT DOCUMENTS

| | | | | |
|---|---|---|---|---|
| 4,008,470 | A | * | 2/1977 | Lanning et al. ............. 342/444 |
| 4,924,448 | A | * | 5/1990 | Gaer ............................. 367/88 |
| 5,043,903 | A | * | 8/1991 | Constant ..................... 701/300 |
| 5,231,609 | A | * | 7/1993 | Gaer ............................. 367/99 |
| 5,521,817 | A | * | 5/1996 | Burdoin et al. ................. 701/3 |
| 5,523,951 | A | * | 6/1996 | Kriesgman et al. ........... 701/21 |
| 5,810,297 | A | | 9/1998 | Basuthakur et al. |
| 6,028,817 | A | * | 2/2000 | Ambs ............................ 367/16 |
| 6,072,433 | A | * | 6/2000 | Young et al. ................. 342/386 |
| 6,338,023 | B1 | * | 1/2002 | Bourgeois et al. ............... 702/5 |
| 6,590,831 | B1 | * | 7/2003 | Bennett et al. ................ 367/16 |
| 6,653,970 | B1 | * | 11/2003 | Mitra ............................ 342/22 |
| 6,691,038 | B2 | * | 2/2004 | Zajac .......................... 702/14 |
| 7,024,309 | B2 | * | 4/2006 | Doane ......................... 701/301 |
| 7,272,472 | B1 | * | 9/2007 | McElreath ...................... 701/3 |
| 7,391,673 | B2 | * | 6/2008 | Regone et al. ................. 367/16 |
| 8,096,511 | B2 | * | 1/2012 | Frenkiel et al. ............. 244/158.4 |
| 2003/0208320 | A1 | | 11/2003 | Zajac |
| 2006/0114324 | A1 | * | 6/2006 | Farmer et al. ............... 348/144 |
| 2006/0235584 | A1 | * | 10/2006 | Fregene et al. ............... 701/23 |

FOREIGN PATENT DOCUMENTS

| | | | | |
|---|---|---|---|---|
| EP | 1065518 | A2 | * | 1/2001 | ............. G01S 13/87 |
| WO | WO 02/25315 | A2 | * | 3/2002 | ............. G01V 1/38 |

OTHER PUBLICATIONS

Gaer, Marcin C. et al., "Analytical methods for acoustic seabed exploration", MTS/IEEE Oceans '95 Conference Proceedings vol. 1: Challenges of Our Changing Global Environment. Date of Conference: Oct. 9-12, 1995, pp. 214-220, vol. 1.*
Cheng, Lei et al., "Communication-Based Multiple Mobile Robots Rigid Formation Control", IEEE 2004 8th International Conference on Control, Automation, Robotics and Vision, Kunming, China, Dec. 6-9, 2004, pp. 729-734.*
Kannan, Rajgopal et al., "Efficient Protocols for Integrated Communication and Formation Control in UUV Task Forces", Naval Research Labs report NRL/PP/7440-3-1022, ONR, Jul. 21, 2003, downloaded from http://www.dtic.mil/cgi-bin/GetTRDoc?Location=U2&doc=GetTRDoc.pdf&AD=ADA417078.*
Borelli, Francesco et al., "Collision free UAV Formation Flight Using Decentralized Optimization and Invariant Sets", 43rd IEEE Conference on Decision and Control, Dec. 14-17, 2004, Paradise Island, Bahamas, Paper TuC05.4, pp. 1099-1104.*
Curtin, Thomas B. et al., "Guest Editorial: Autonomous Ocean-Sampling Networks", IEEE Journal of Oceanic Engineering, vol. 26 No. 4, Oct. 2001, pp. 421-423.*
EPO machine translation of EP 1065518 A2 (original EP document published Jan. 3, 2001).*
Gierull, Christoph H., "Bistatic synthetic aperture radar" (TIF—Report, Phase I), Defence R&D Canada, Technical Report DRDC Ottowa TR-2004-190, Nov. 2004, 112 pages.*
Tomiyasu, Kiyo, "Tutorial review of synthetic-aperture radar (SAR) with applications to imaging of the ocean surface", Proceedings of the IEEE, vol. 66 No. 5, May 1978, pp. 563-583.*

* cited by examiner

METHOD AND SYSTEM FOR SENSOR GEOMETRY

BACKGROUND OF THE INVENTION

The invention relates to a method for dynamic sensor geometry by means of formation control of sensor carrying craft to achieve desired sensor geometry. The invention also relates to a system for performing the method.

Today, craft are provided with different kinds of sensor systems for data collection. Typical sensors/applications may be: multibeam echo sounders/subsea survey, sonar/fishing, sonar/mine detecting, hydrophones/maritime seismology, laser scanner/topographical survey and similar.

The craft's sensor systems will have a limited coverage. This is commonly solved by running the sensor carrier (the craft) in repetitive and partly overlapping patterns in order to be able to interpolate the measured results to a general measured result over a given area. Sensor carrying craft typically have a very high amount of daily use. To increase the efficiency of craft based data collection, there are three obvious alternatives:

1. Increase the speed of the sensor carriers, thereby covering a larger area per unit time;
2. Increase the coverage of the sensors; and
3. Increase the number of sensors.

The speed at which the measuring can be performed (the speed of the craft) is often limited due to limitations in measuring technique (quality of measured data).

The coverage of the sensors may also be limited by the measuring technique. Often it is desirable to have a high sensor resolution, so the effective search area of the sensor must therefore be low.

Increasing the number of sensors is not without thought a possible solution, as the sensors still are dependent of being arranged to the craft, and thus will have overlapping coverage.

It is not known publications which disclose or suggest methods for achieving a desired sensor geometry by means of formation control of sensor carrying craft.

SUMMARY OF THE INVENTION

The object of the invention is to provide a method for creating a dynamic sensor geometry by means of formation control of sensor carrying craft to achieve a desired sensor geometry. It is further an object of the invention to facilitate effective data collection by means of the formation controlled craft in a desired sensor geometry. The sensor carrying craft may operate on the ground (driving craft), at the water surface (floating craft), under water (submerged craft) and/or in the air (flying craft). The craft may be manned and/or unmanned. The sensor carrying craft may be provided with one or more sensor means, either arranged in or on the sensor carrying craft and/or external to the sensor carrying craft in suitable ways, such as towed behind the craft.

One embodiment of the method according to the invention may increase the measuring efficiency and coverage by increasing the number of sensors. The sensors are arranged on respective sensor carrying craft, said craft being controlled to a desired sensor geometry for the sensors by means of the method according to the invention. Reference herein to carrying craft encompasses all types of craft which can carry sensors, which may operate on land, water and/or in the air, and which can be manned or unmanned. The sensor carrying craft are provided with one or more sensor means that are engaged with the sensor carrying craft in suitable ways, such as towed behind the craft.

In another embodiment of a method according to the invention may use information about the covering angle of the sensors to maintain a fixed overlap, even though the distance to the measuring object varies. This is obtained by varying relative distance between the sensor carrying craft.

By the use of, for example, unmanned sensor carrying crafts, which are held in a physical position by means of a method for sensor geometry according to the invention, it is possible to increase the number of sensors, for example, when undertaking marine surveys, without significantly increasing the corresponding costs. Unmanned sensor carrying craft typically have a substantially lower working and operational costs than manned sensor carrying craft of similar capacity.

By means of a method for sensor geometry according to the invention, dynamic sensor geometry may be achievable by means of formation control of the sensor carrying craft. The geometry is controllable and thus it is possible to dynamically change the relative geometry of the sensors, depending on the desired operation.

A method for creating a sensor geometry according to the invention can be summarized in the following steps:

a) Acquiring formation definition parameters,
b) Acquiring formation member state vectors,
c) Acquiring an own state vector,
d) Comparing the own state vector with information from step a) to c),
e) Calculating new course and speed,
f) Calculating control power based on step e),
g) Setting the calculated control power in step f) on sensor carrier,
h) Continually repeating the steps a) to g).

Step a) includes the acquisition of manually defined parameters which define the sensor geometry/shape of the formation (relative distance and position), and other possible parameters for controlling, e.g., search width of the sensors and/or the distance of the sensors to the object to be measured, or other sensor measured parameters which indicate the need for formation change to improve the quality of the measuring technique. The parameters are preferably acquired from a command centre.

Step b) includes the acquisition of state vectors of the other formation members to provide information about their position, speed and direction. The information is available from the navigation system of each member/sensor carrying craft.

Step c) includes the acquisition of own state vector of a sensor carrying craft from its own navigation system.

Step d) includes comparison of the own state vector of the sensor carrying craft with the information acquired in the steps a) to c).

Step e) includes the calculation of a new desired state vector, based on the comparison in step d). Step d) and e) are preferably performed by formation control means which are provided with software/algorithms and/or programmed for this.

Step f) includes the calculation of control power for the sensor carrying craft to achieve desired state vector based on step e), which preferably is performed by direction/velocity control means. The own state vector is preferably provided as a reference for continuous comparison with a new desired state vector and continuous adjustment of the control power to achieve the desired state vector for the sensor carrying craft.

Step g) includes controlling of the control power of the sensor carrying craft by means of direction/velocity control means based on a continuous comparison of the desired state vector and the at each time present own state vector of the sensor carrying craft for rapid control of the control power.

Step h) includes repeating the steps a) to g) continuous during an operation.

The method can be performed by that each sensor carrying craft includes direction/propulsion means and a control system adapted for performing the method.

The method has many areas of use and the sensor carrying craft can include sensor means engaged with the craft or in some other way connected to the craft (towing etc.), such as multibeam echo sounders/subsea survey, sonar/fishing, sonar/mine detecting, hydrophones/maritime seismology, laser scanner/topographical survey, orthophoto/landscape survey.

Further details of the invention will appear from the following example description.

BRIEF DESCRIPTION OF THE DRAWINGS

The invention will in the following be described in the form of embodiments with references to the attached drawings, where.

DESCRIPTION OF THE PREFERRED EMBODIMENTS

Figure 1:
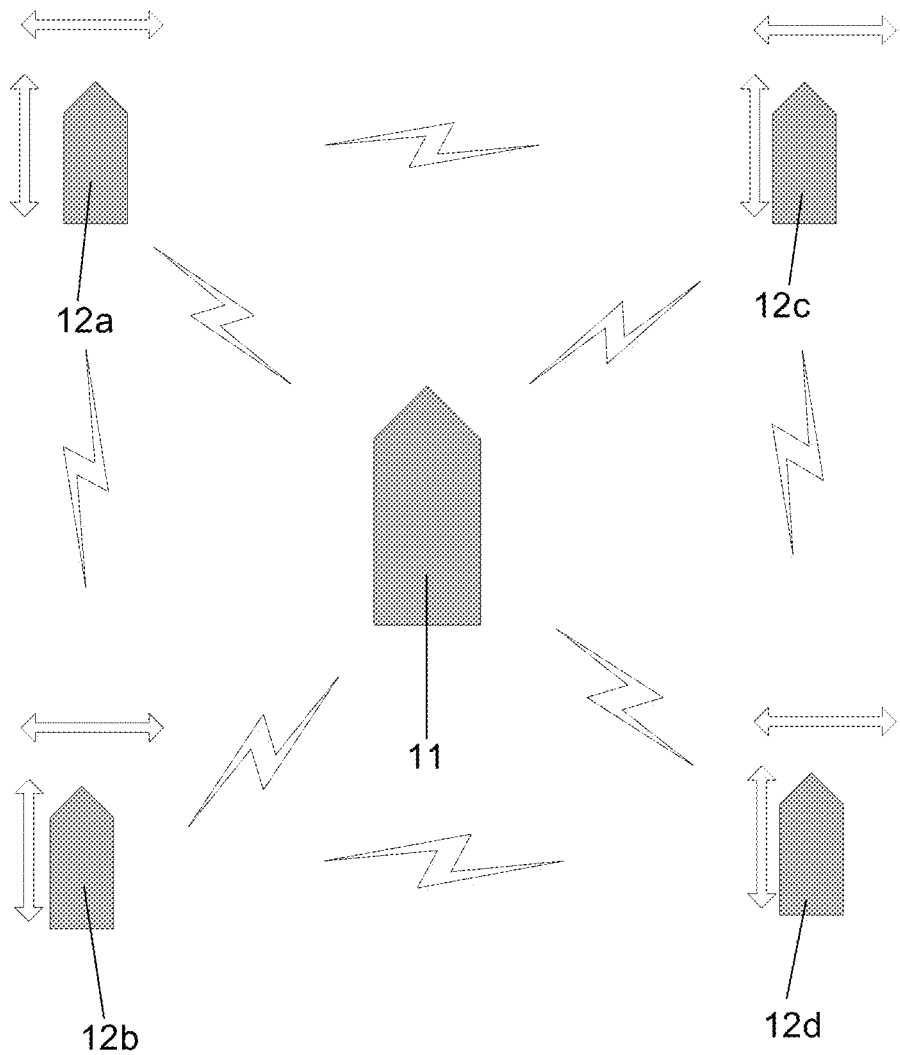
FIG. 1 shows a communication network according to the invention.

FIG. 1 shows the communication structure between the different formation members in a communication network according to the invention. The Figure shows an example of five sensor carrying craft 11 and 12a-d, where the sensor carrying craft 11 is the main craft and the sensor carrying craft 12a-d are other craft. The main craft 11 includes preferably a command centre for monitoring, controlling and manual setting of parameters to determine the sensor geometry by means of formation control of the other craft 12a-d. The communication between the units is preferably performed wirelessly and the different units 11 and 12a-d are provided with means for wireless communication, preferably with real time data communication means. All the formation members/ the sensor carrying craft 11 and 12a-d can thus be addressed uniquely.

Figure 2A:
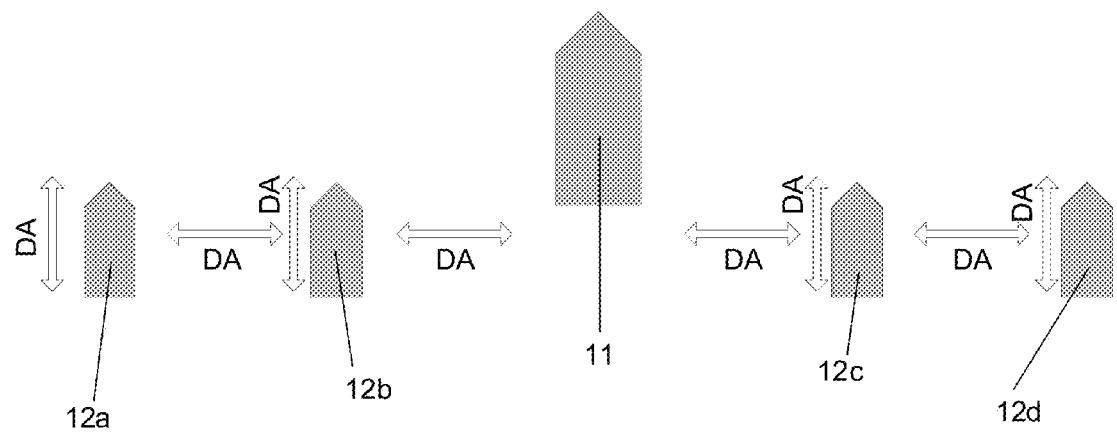
FIGS. 2a and 2b shows two different sensor geometries which can be achieved by means of formation control of sensor carrying craft according to the invention.
Figure 2B:
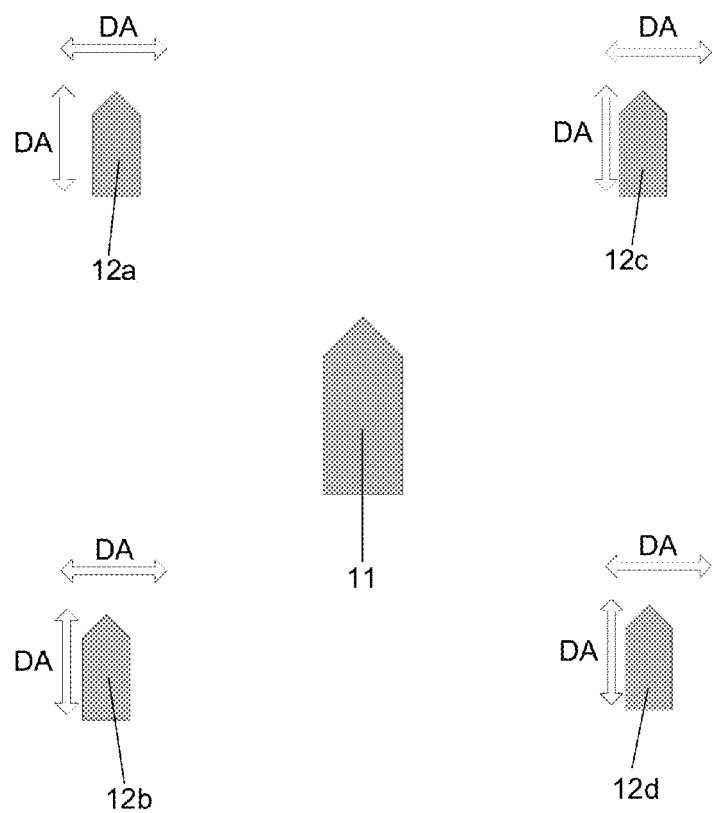

FIGS. 2a and 2b shows examples of sensor geometries achieved in accordance with the invention by means of formation control of the sensor carrying craft 12a-d in relation to the main craft 11. The Figures shows how the method is applied to a plurality of sensor carrying craft 11 and 12a-d to achieve two different geometries for formations.

Figure 3:
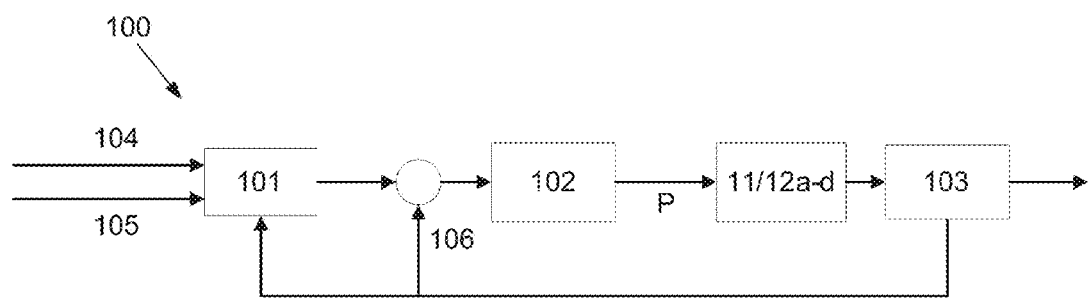
FIG. 3 is a block diagram of a control system for a first embodiment of the invention.

Each sensor carrying craft 12a-d further includes a control system 100, which is shown as a block diagram in FIG. 3. The control system 100 preferably includes formation control means 101, direction/velocity control means 102, a block for the craft 12a-d and a navigation system 103. The Figure further shows the information flow in the control system 100.

In this embodiment, the formation control means 101 is provided with the following input:

1. Formation definition parameters 104—manually defined parameters which define the shape of the formation (relative distance and position),
2. Formation member state vectors 105—state data of the other formation members 11 and 12a-d.

The formation control means 101 is in addition provided with information from a navigation system 103 about its own state data, such as position, direction and speed from the navigation system in the form of a state vector 106.

The formation definition parameters 104 are preferably manually set from the command centre of the main craft 11 or a command centre nearby.

The formation control means 101 are further provided with software/algorithms and/or programmed to compare the own state vector 106 of the sensor carrying craft 12a-d, provided from the navigation system 103, with the input parameters.

The formation control means 101 next calculates a new desired state vector for the sensor carrying craft 12a-d. The calculated state vector is provided to the direction/speed control means 102, which sets the control power P on the power means of the sensor carrying craft 12a-d. The present state vector 106 of the sensor carrying craft 11 and 12a-d is preferably continuously provided in real time as a reference for continuous comparison between the desired state vector and the own state vector of the sensor carrying craft for rapid controlling of the control power.

In this way a dynamic configurable relative distance DA between the different sensor carrying craft 11 and 12a-d is achieved, which can be controlled to desired sensor geometry by means of formation control of the sensor carrying craft 12a-d around the main craft 11 in the present example. As the sensor geometry (formation control of the sensor carrying craft) is controllable, the relative geometry of the sensors depending on desired operation can thus be dynamically changed, depending on the desired operation.

Figure 4:
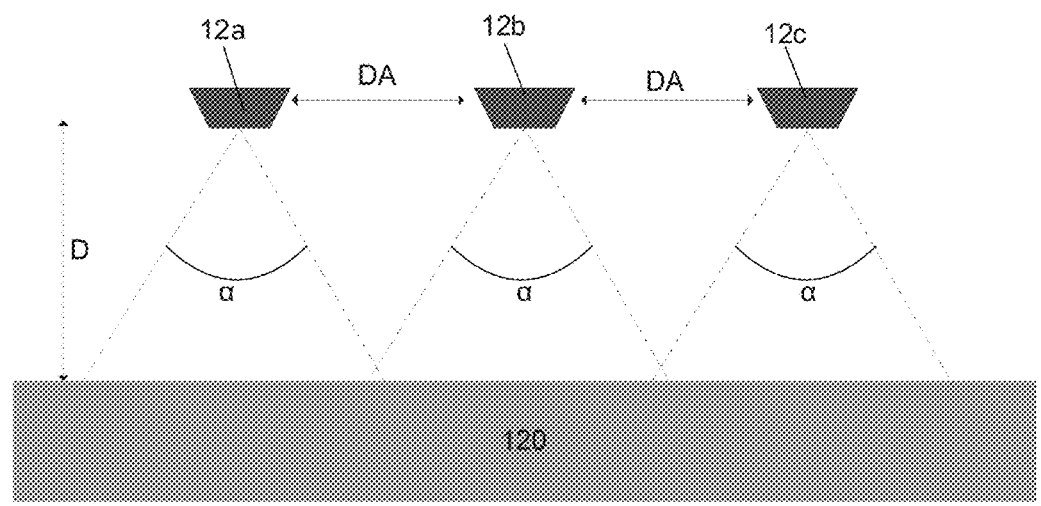
FIG. 4 shows data collection from the seabed.

FIG. 4 shows a second embodiment according to the invention, which is adapted for data collection from the seabed. At data collection, for example, from a seabed 120, the sensors typically have a fixed covering angle α. When these sensors are carried by formation controlled sensor carrying craft 12a-c, it is usually desired that the covering area should overlap some. Provided that the covering angle α of the sensors is fixed, the effective search width of the sensors will change with the distance to the object to be measured (the ocean depth D in this example).

According to the invention it is provided a method which ensures that the sensor maintain a fixed overlap even though the distance to the measuring object D changes. This is obtained by changing relative distance DA between the sensor carrying craft 12a-c. For example, if the distance D increases, the distance DA between the formation members, i.e. the sensor carrying craft 12a-c, increases due to the sensor will be able to survey ("look") at a larger width of the measured object 120. To perform this, the distance D is used as an input control parameter for the control system 100', i.e. as input to the formation control means 101.

Figure 5:
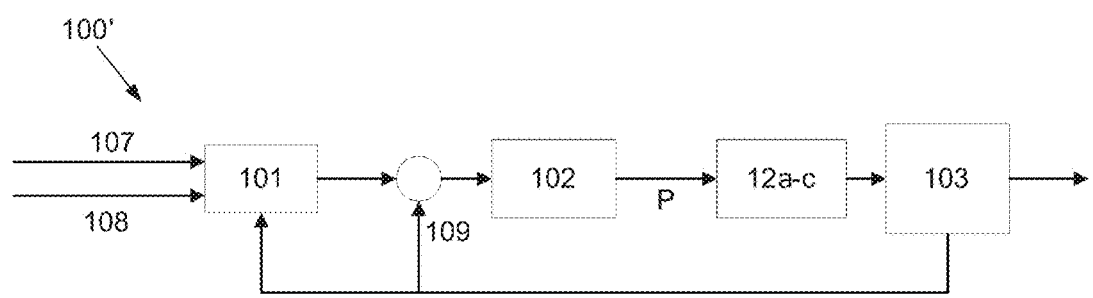
FIG. 5 is a block diagram of a control system for a second embodiment of the invention.

Referring now to FIG. 5, which is a block diagram of the control system 100' for a second embodiment of the invention.

The control system 100' includes, as above, formation control means 101, direction/speed control means 102, a block for the craft 12a-c, and a navigation system 103. The navigation system 103 also includes a distance sensor to provide information about the distance D to the object to be measured 120.

The Figure further shows the information flow in the control system 101'.

In this embodiment, the formation control means 101 are provided with the following input:

1. Formation parameters 107—manually defined parameters which define the shape of the formation and the search width of the sensors and the desired overlap of the sensors,
2. Formation member state vectors 108—the other formation member state data.

The formation control means 101 are also provided with information from a navigation system 103 about its own state data, such as position, direction and speed, and in addition information about the distance D down to the measuring object in the form of a state vector 109.

The formation control means 101 are also provided with information from a navigation system 103 about its own state data, such as position, direction and speed, and in addition information about the distance D down to the measuring object in the form of a state vector 109. The formation control means 101 are also provided with software/algorithms and/or programmed for comparing the own state vector 109 of the craft 12a-c, provided from the navigation system 103, with the input parameters. The formation control means 101 then calculates a new desired state vector for the sensor carrying craft 12a-c. The calculated state vector is provided to the direction/speed control means 102 which set the control power P on the control power means of the sensor carrying craft 12a-c, in the same way as in the first embodiment. The present own state vector 109 of the sensor carrying craft 12a-c is preferably continuously provided in real time as a reference for continuous comparison between the desired state vector and the at each time present state vector of the sensor carrying craft, for rapid control of the control power.

In this way, a dynamic relative distance DA between the different sensor carrying craft 12a-c is achieved, which can be controlled to a desired sensor geometry by means of the sensor carrying craft 12a-c, such that the sensors overlap each other some. As the geometry is controllable it is thus possible to dynamically change the relative geometry of the sensors, depending on the distance to the measuring object in relation to the covering angle of the sensors.

Modifications

A possible main craft can also be an equal craft in the arrangements above, where the operation then is controlled from a location nearby. If a craft nearby is used as command centre, a main craft will not be needed, but all the craft can be controlled to a desired sensor geometry by means of formation control of the craft.

The number of craft can be changed to a desired number according to desired operation and object.

The method can further include control parameters, such as other measuring technique control parameters which are to be used to maintain a sensor geometry. For example, the relative distance DA can be changed as a function of reflected sound/electromagnetism from a source and/or other measured sensor measurement as, for example, described under FIG. 4.

The method can be used for formation control of both submersible craft, surface craft (maritime or ground based) and flying craft, or a combination of these. For submersible craft or flying craft, input parameters about the distance from the individual craft to the water surface and seabed (for submersible vessels) or distance above the sea surface or to the ground (flying craft) is needed.

As the different sensor carrying craft can be addressed uniquely it is possible to provide the sensor carrying craft with different sensor means and control them accordingly.

The method can be adapted for the different sensor means which can be handled by the sensor carrying craft, such as multibeam echo sounders/subsea survey, sonar/fishing, sonar/mine detecting, hydrophone streamers/maritime seismology, laser scanner/topographical survey, sensors/geology and similar.

What is claimed is:

1. A method for data collection from a seabed by means of formation control of formation members in the form of multiple, individually controllable unmanned sensor carrying crafts, which sensor carrying crafts are provided with at least one sensor with a fixed search width arranged on each sensor carrying craft and/or towed behind the each sensor carrying craft, the sensor carrying crafts are further each provided with a control system including formation control means for controlling a formation of the sensor carrying crafts and a navigation system, wherein the method comprises the following steps:
   a) at each sensor carrying craft, receiving formation parameters set by a command center defining a physical shape of the formation of the sensor carrying crafts, the formation parameters including a relative distance between, and position of, the sensor carrying crafts, the search width of the sensor, and a desired fixed overlap of the sensors;
   b) receiving information about present position, speed, and direction for each of the formation members from the navigation system arranged on each sensor carrying craft by the formation control means on each sensor carrying craft;
   c) receiving information about a measured distance to the seabed from a distance sensor arranged on each sensor carrying craft;
   d) dynamically changing the relative distance between the sensor carrying crafts for maintaining the desired fixed overlap between sensors based on the measured distance to the seabed in relation to the search width of the sensors in order to maintain the desired fixed overlap of the sensors; and
   e) continually repeating steps b) to d) for each sensor carrying craft.

2. The method according to claim 1, wherein step d) is carried out using a formation control means provided with software/algorithms, or programmed to carry out step d).

3. The method according to claim 1, further comprising the step of using the navigation system arranged on each sensor carrying craft, to provide information about position, direction, and speed for each sensor carrying craft in the form of a state vector.

4. The method according to claim 1, wherein said sensors have a fixed covering angle.

5. The method according to claim 1, wherein the method comprises maintaining a fixed overlap of covering area of the sensors of the sensor carrying crafts.

* * * * *